United States Patent
Tadros

(10) Patent No.: US 7,422,246 B2
(45) Date of Patent: Sep. 9, 2008

(54) REMOTE PIPE COUPLING SYSTEM

(75) Inventor: Fred M. Tadros, Mississauga (CA)

(73) Assignee: Straub Tadco Inc., Mississauga, ON (CA)

( * ) Notice: Subject to any disclaimer, the term of this patent is extended or adjusted under 35 U.S.C. 154(b) by 317 days.

(21) Appl. No.: 10/926,328

(22) Filed: Aug. 26, 2004

(65) Prior Publication Data

US 2006/0043735 A1 Mar. 2, 2006

(51) Int. Cl.
F16L 55/00 (2006.01)

(52) U.S. Cl. .................. 285/39; 285/112; 285/419; 285/420; 138/155

(58) Field of Classification Search ............ 285/38–39, 285/373, 419–420, 367, 27–29, 24, 417, 285/112; 138/155, 177, 109; 81/177.5, 124.7; 254/29 R
See application file for complete search history.

(56) References Cited

U.S. PATENT DOCUMENTS

| | | | | |
|---|---|---|---|---|
| 2,469,516 A * | 5/1949 | Pearson | .......................... | 285/6 |
| 2,675,254 A * | 4/1954 | Davis et al. | .................... | 285/6 |
| 2,677,558 A * | 5/1954 | Cornelius | ....................... | 285/6 |
| 2,958,125 A * | 11/1960 | Nichols | ........................ | 29/237 |
| 3,416,395 A * | 12/1968 | Hanson | ....................... | 81/125 |
| 4,056,273 A * | 11/1977 | Cassel | ......................... | 285/337 |
| 4,261,600 A * | 4/1981 | Cassel | .................... | 285/148.26 |
| 4,813,720 A * | 3/1989 | Cassel | ......................... | 285/419 |
| 4,842,306 A * | 6/1989 | Zeidler et al. | ............... | 285/104 |
| 5,096,235 A * | 3/1992 | Oetiker | ........................ | 285/308 |
| 5,137,305 A | 8/1992 | Straub | ......................... | 285/112 |
| 5,203,594 A | 4/1993 | Straub | ......................... | 285/112 |
| 5,273,322 A | 12/1993 | Straub | ......................... | 285/112 |
| 5,280,969 A | 1/1994 | Straub | ......................... | 285/105 |
| 5,280,970 A | 1/1994 | Straub | ......................... | 285/112 |
| 5,310,223 A | 5/1994 | Straub | ......................... | 285/112 |
| 6,145,896 A * | 11/2000 | Vitel et al. | .................... | 285/414 |
| 6,758,501 B2 * | 7/2004 | Amedure et al. | ............ | 285/373 |
| 2002/0014772 A1 * | 2/2002 | Amedure et al. | ............ | 285/373 |

* cited by examiner

Primary Examiner—Aaron M Dunwoody
Assistant Examiner—Fannie Kee
(74) Attorney, Agent, or Firm—Hill & Schumacher; Nancy E. Hill

(57) ABSTRACT

A remote pipe coupling system includes a first pipe, a second pipe and a pipe coupling. The pipe coupling is adapted to couple the first pipe and the second pipe and it has a loose position and a tightened position. A guide is operably connected to the pipe coupling and the first pipe such that the pipe coupling can move from an open position to a coupled position. The system includes a device to remotely move the pipe coupling along the guide from the open position to the coupled position. The system also includes a device to change the pipe coupling from the loose position to the tightened position.

7 Claims, 6 Drawing Sheets

REMOTE PIPE COUPLING SYSTEM

FIELD OF THE INVENTION

This invention relates to pipe couplings and in particular pipe couplings that can be serviced remotely.

BACKGROUND OF THE INVENTION

Pipes are used in a wide variety of applications. They are often used in hostile, controlled or heavily regulated environments. For example, extensive piping systems are used in water treatment plants. In many of these environments the servicing of the piping system is very costly. For example, if an individual is required to enter the environment it may be required that the individual wear protective clothing which is both costly and time consuming in regard to its use. Further, such clothing would have a limited life span. As well for some of the installations servicing is required to be done by two individuals, one that enters the hostile environment and another that assists the individual in the hostile environment without entering the hostile environment. In addition, in other hard to reach environments it may be necessary to provide scaffolding or the like to service the pipe coupling.

Accordingly it would be desirable to provide a pipe support system that could be serviced from a remote location.

SUMMARY OF THE INVENTION

The present invention is directed to a remote pipe coupling system which includes a first pipe, a second pipe and a pipe coupling. The pipe coupling is adapted to couple the first pipe and the second pipe and it has a loose position and a tightened position. A guide is operably connected to the pipe coupling and the first pipe such that the pipe coupling can move from an open position to a coupled position. The system includes a device to remotely move the pipe coupling along the guide from the open position to the coupled position. The system also includes a device to change the pipe coupling the loose position to the tightened position.

In another aspect of the invention there is provided a new coupling. The coupling includes a collar portion, a pair of collar edges, bolts and a torque stop plate. The coupling is adapted to couple a first pipe and a second pipe and has a loose position and a tightened position. The collar portion fits over the first and second pipes. The bolts attach the collar edges together. The torque stop plate is positioned on one of the pair of collar edges such that when the coupling is in the tightened position the other of the pair of edges rests against the torque stop plate. The torque stop plate is dimensioned to provide a predetermined torque in the bolts when the pair of collar edges rest against the torque stop plate.

Further features of the invention will be described or will become apparent in the course of the following detailed description.

BRIEF DESCRIPTION OF THE DRAWINGS

The invention will now be described by way of example only, with reference to the accompanying drawings. In which.

DETAILED DESCRIPTION OF THE INVENTION

Figure 1:
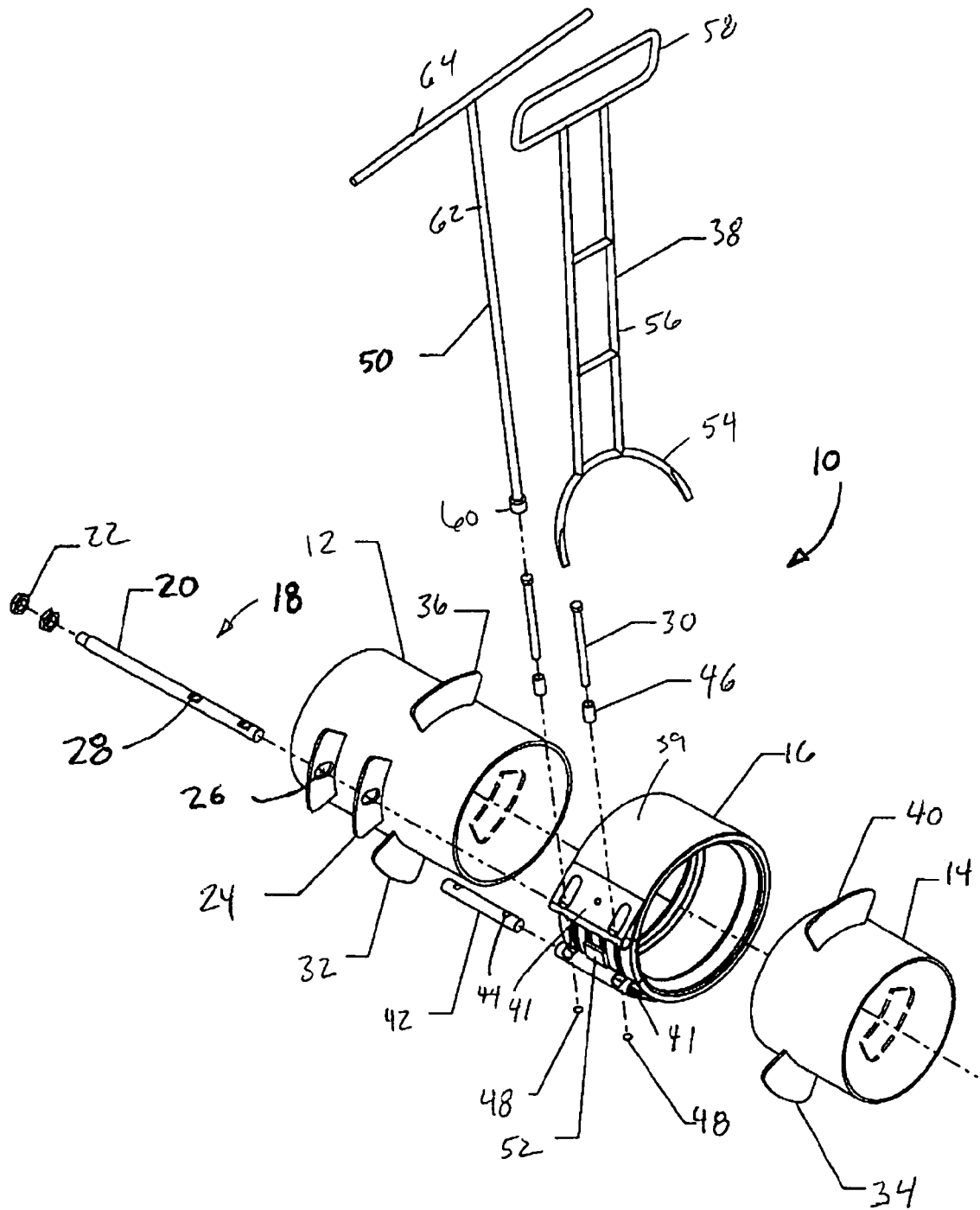
FIG. 1 is a blown apart perspective view of the remote pipe coupling system of the present invention.

Referring to the figures, the pipe coupling system of the present invention is shown generally at 10. The pipe coupling system 10 includes a first pipe 12, a second pipe 14 and a coupling 16.

A guide 18 is connected to the first pipe 12 and the coupling 16. The coupling 16 is slidable along the guide 18 from an open position shown in FIG. 4 to a closed position shown in FIGS. 2 and 3. Guide 18 includes a guide rod 20, two nuts 22 and two guide plates 24. The guide plates 24 are attached to the first pipe 12 and have rod apertures 26 for receiving guide rod 20. Nuts 22 limit the movement of guide rod 20 so that the coupling 16 to which it is attached will not come off pipe 12. Guide rod 20 has a pair of apertures 28 which are adapted to receive the coupling bolts 30.

Figure 2:
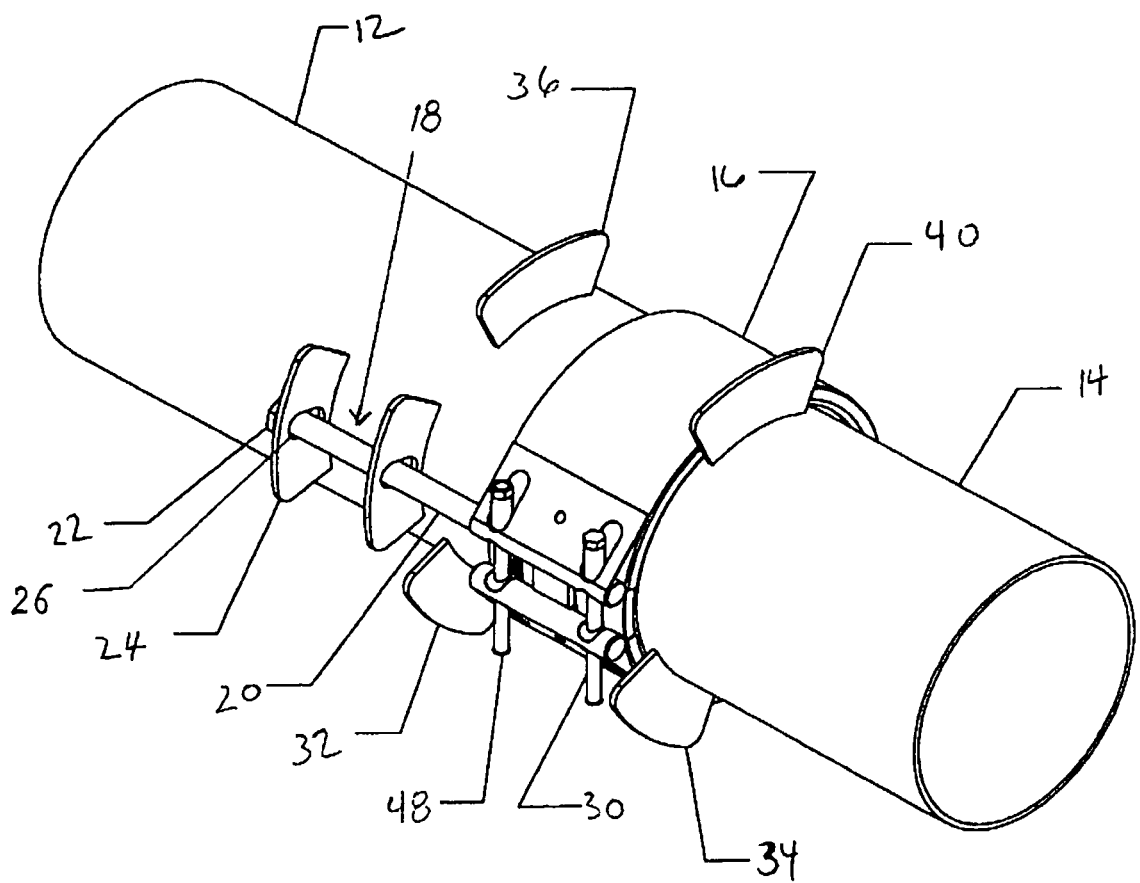
FIG. 2 is a perspective view of the pipe coupling system of the present invention shown in the coupled position.

First and second pipes 12, 14 have an open and a closed stop 32, 34 respectively. The open stop 32 is positioned such that when the coupling 16 is in the open position as shown in FIG. 4 the coupling rests against the open stop 32. Similarly, when the coupling 16 is in the closed position, as shown in FIGS. 2 and 3, the coupling 16 rests against the closed stop 34.

Figure 3:
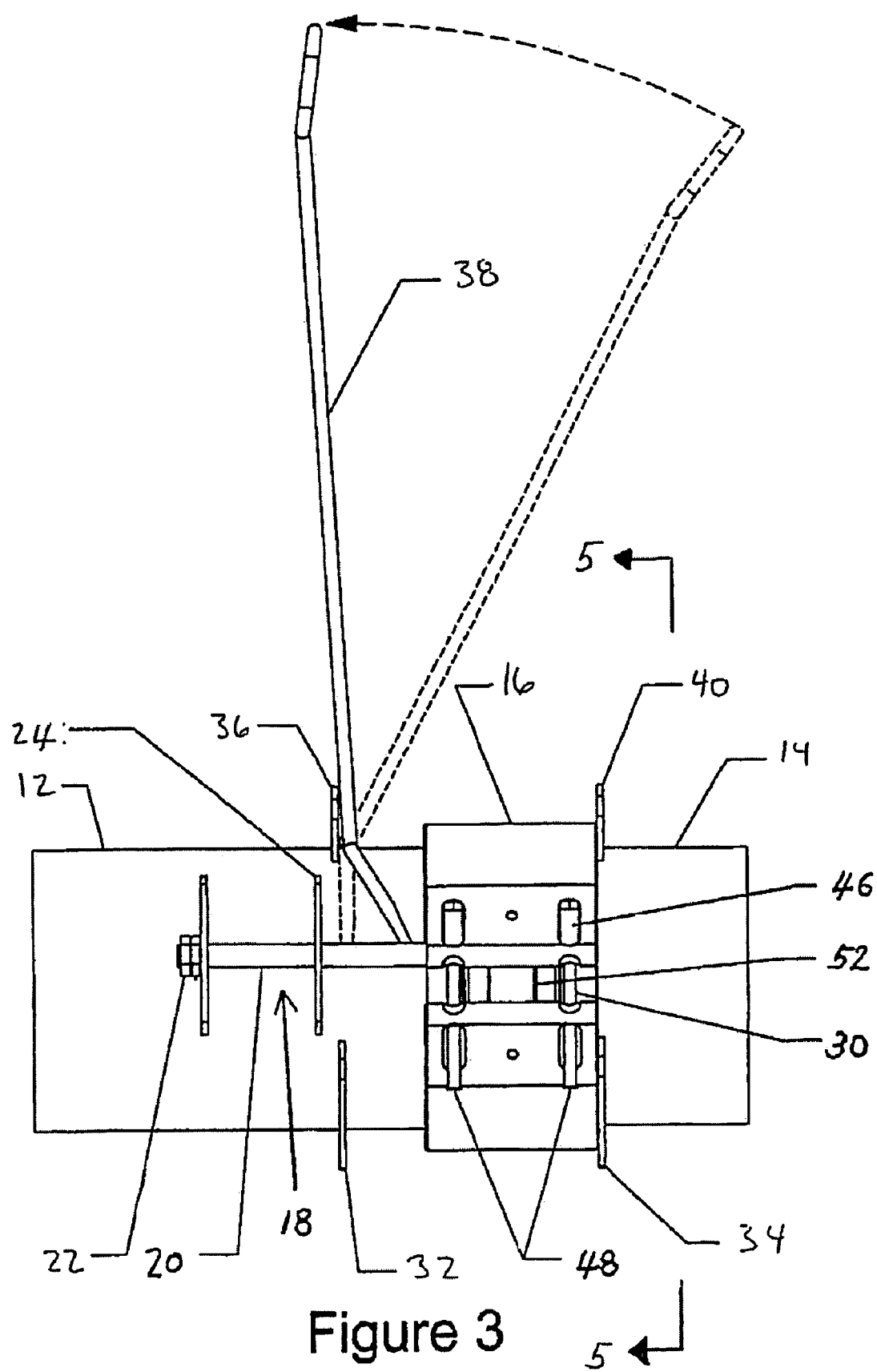
FIG. 3 is a side view of the pipe coupling system of the present invention shown in the coupled position.
Figure 4:
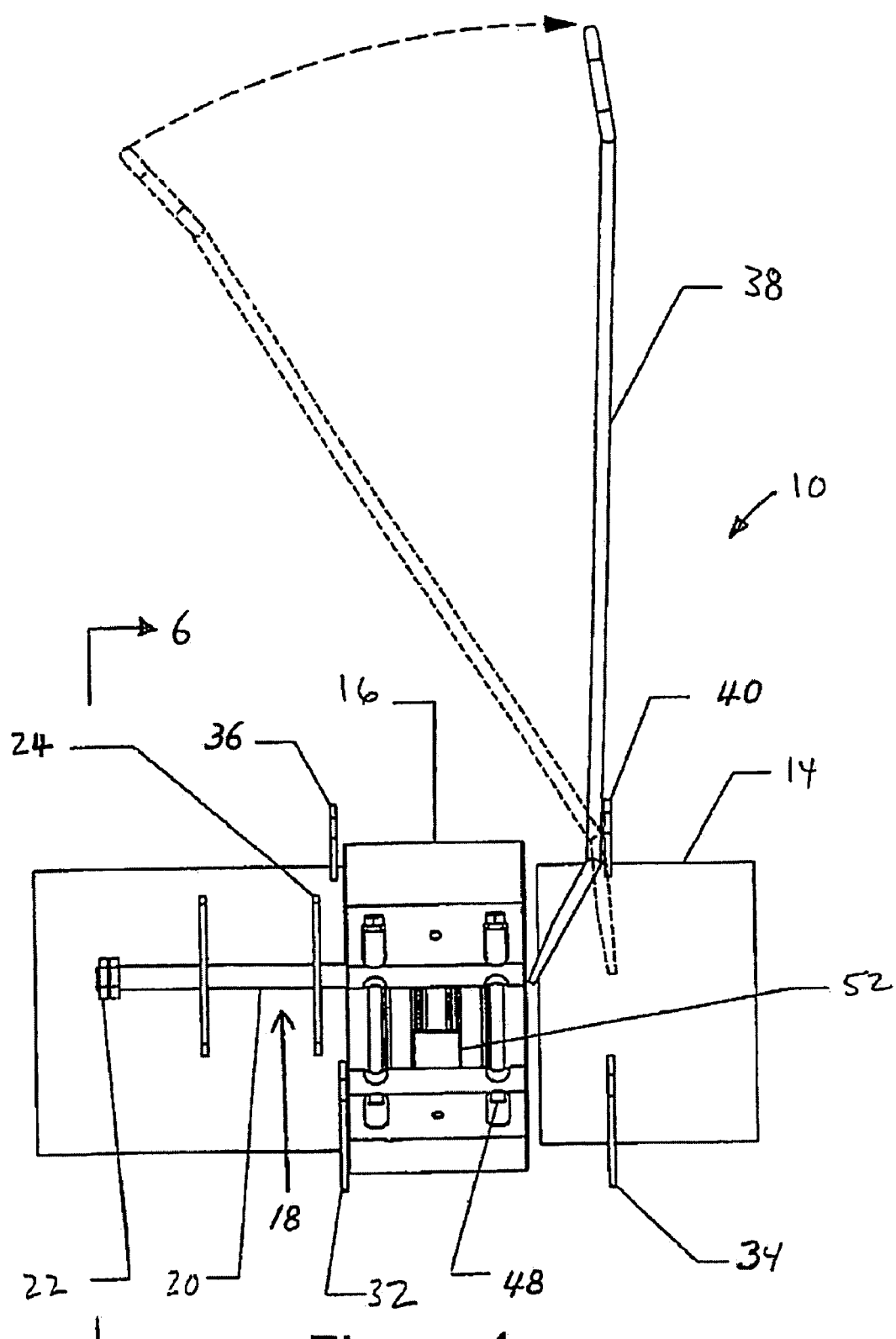
FIG. 4 is a side view of the pipe coupling system of the present invention shown in the open position.
Figure 5:
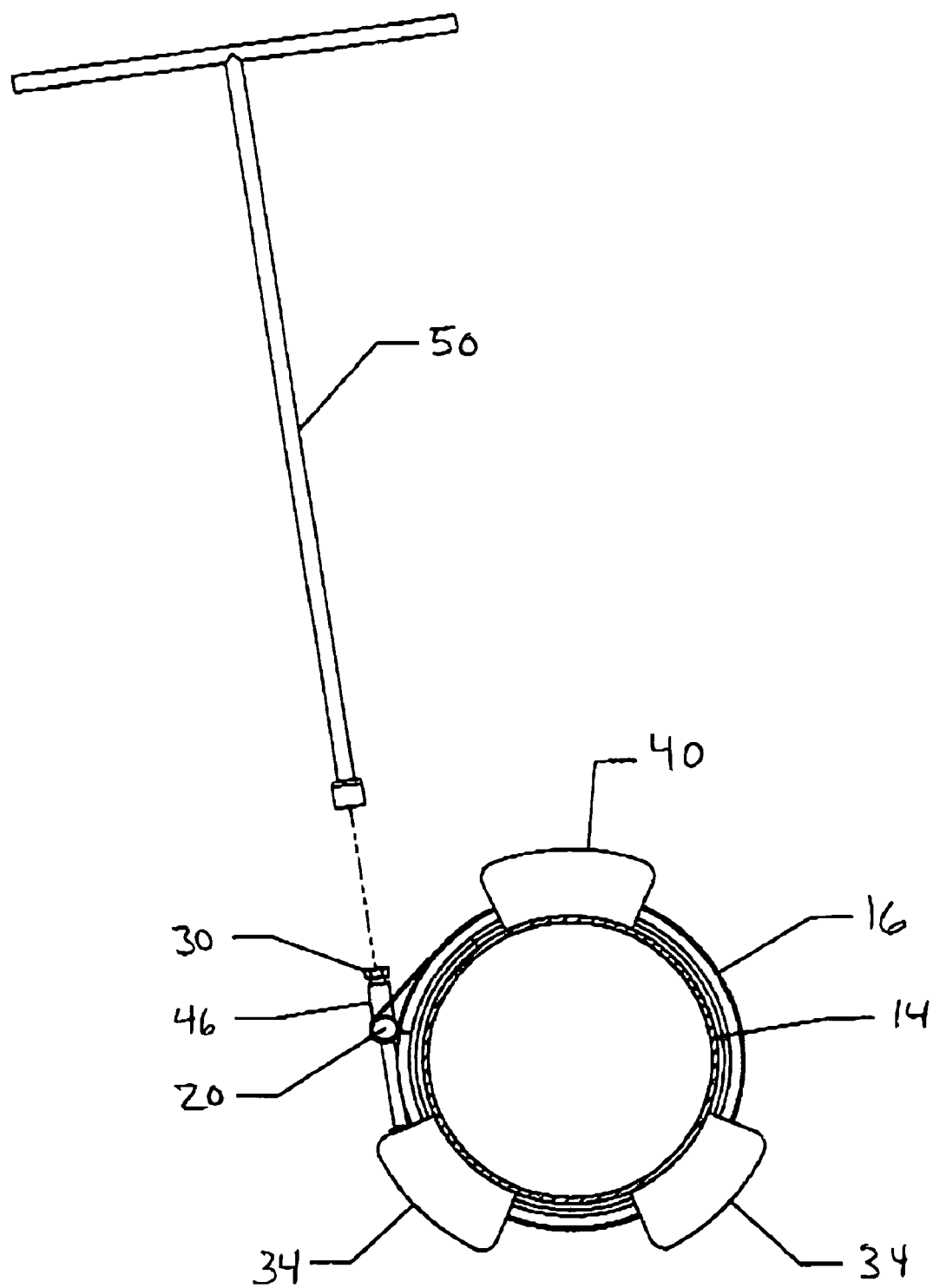
FIG. 5 is an end view of the pipe coupling system of the present invention as viewed from 5 in FIG. 3.
Figure 6:
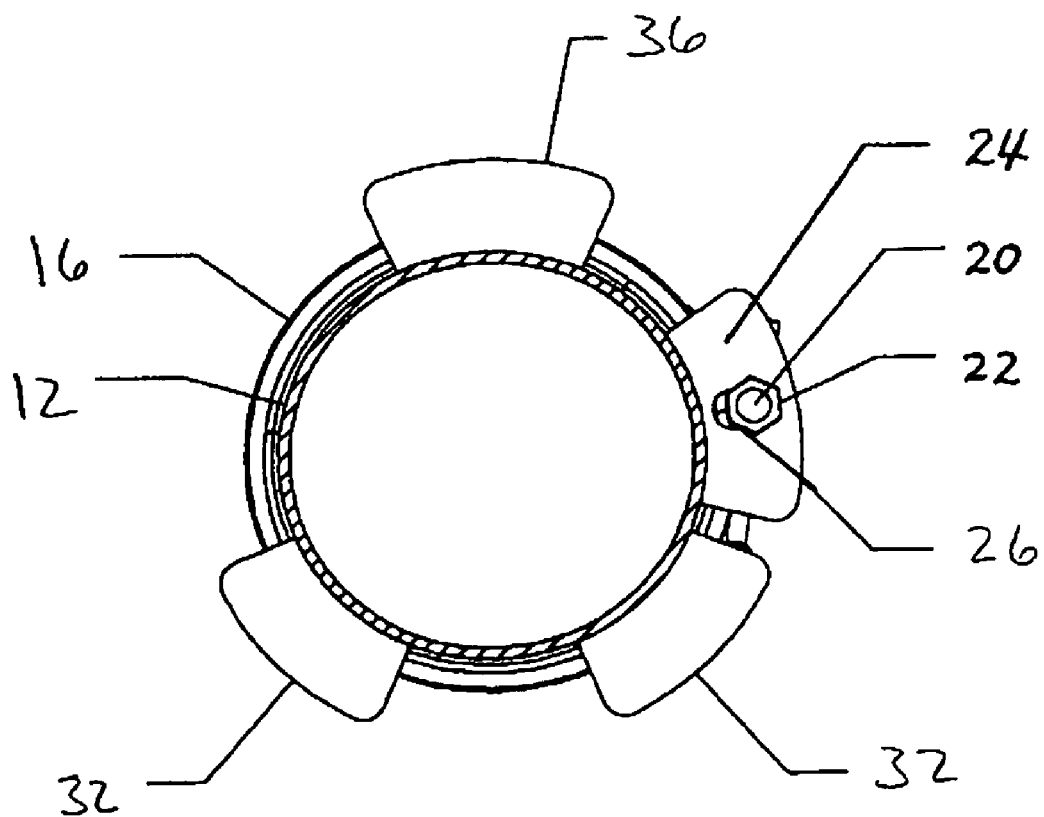
FIG. 6 is an end view of the pipe coupling system of the present invention as viewed from 6 in FIG. 4.

A first brace plate 36 is attached to the first pipe 12 to provide a surface for the moving tool 38 to brace against when the coupling 16 is moved from the open position to the closed position, as best seen in FIG. 3. As can be seen in FIG. 4 the first brace plate 36 is offset from the open stop 32 so that the moving tool 38 can easily engage the coupling 16. Similarly a second brace plate 40 is attached to the second pipe 14 to provide a surface for the moving tool 38 to brace against when the coupling pipe 12 is moved from the closed position to the open position, as best seen in FIG. 4. Note that in the open position guide 18 will prevent the moving tool 38 from being braced against the coupling 16 on pipe 12, and therefore an offset is provided so that the moving tool 38 can be braced against the coupling 16 on pipe 12. In contrast, in the closed position guide 18 is not projected beyond the coupling 16 on pipe 14, so the moving tool 38 can easily brace against the coupling 16 on pipe 14. Accordingly brace 40 is not offset from the stops 34.

The coupling used herein is a struab coupling similar to that shown in U.S. Pat. No. 5,137,305 and modified for this application. It will be appreciated by those skilled in the art that other couplings could also be modified to be adapted for use in the coupling system of the present invention. Coupling 16 includes a collar portion 39 and a pair of collar edges 41. Coupling 16 has a short rod 42 with a pair of threaded bolt apertures 44 for receiving the coupling bolts 30. Coupling bolts 30 each have a coupling collar 46 at one end thereof proximate to the head and a washer 48 welded to the bolt threaded end. The washer 48 acts as a stop so that the bolt 30 cannot be removed from the coupling 16. The coupling bolts 30 are loosened and tightened with a T-bar wrench 50. Coupling bolts 30 hold the collar edges 41 together. A torque stop plate 52 is positioned between the edges of the coupling collar to provide a stop so that when tightened the bolts 30 will achieve the correct torque. It will be appreciated by those skilled in the art that the appropriate torque varies depending on the application of the coupling and thus the dimensions of the stop plate will vary depending on the desired torque. The coupling 16 is moved from the open position to the closed position with moving tool 38. It will be appreciated by those skilled in the art that other types of wrenches and moving tools could be used.

The moving tool 38 includes a generally C-shaped collar 54, an elongate shaft 56 and a handle portion 58. The C-shaped collar portion 54 is shaped to fit around first and second pipes 12, 14 such that when the C-shaped collar fits around the pipe the distal ends thereof will bear against the coupling 16. Thus if the user arranges the C-shaped collar such that it also bears against the first brace plate 36 the user can move the coupling 16 from an open position to a closed position. Similarly when the user arranges the C-shaped collar such that it bears against the second brace plate 40 the user can move the coupling 16 from the closed position to the open position.

The T-bar wrench 50 includes a wrench head 60 attached to an elongate wrench shaft 62 and a T-bar handle 64.

In use the pipe system of the present invention will be placed in position. The coupling 16 is then moved from the open position to the closed position with the moving tool 38, as shown in FIG. 3. Thereafter the bolts 30 are tightened with the wrench 50. Once the coupling 16 is tightened such that the edges touch the stop plate 52, the coupling is in position. Thereafter, when the coupling 16 is in need of service the process is reversed. Accordingly, it will be appreciated by those skilled in the art that the system of the present invention allows a user to open and close a coupling from a remote location. This is particularly useful when the pipes are in a water treatment plant where heretofore servicing pipes that were underwater or other liquid required the maintenance staff to service the equipment according to specific protocols which generally required them to wear specially constructed suits and have a buddy remain outside the service area but in touch. Accordingly servicing the pipe coupling system from a remote location by using the coupling system of the present invention will be both easy and cost effective.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A remote pipe coupling system that can be serviced from the remote location, comprising:
   a first pipe;
   a second pipe;
   a pipe coupling for coupling the first pipe and the second pipe and having an open position and a closed position;
   a guide operably connected to the pipe coupling and the first pipe such that the pipe coupling can move from the open position to the closed position;
   means for moving the pipe coupling along the guide from the open position to the closed position from a remote location;
   means for changing the pipe coupling from a loose position to a tightened position from a remote location;
   wherein the pipe coupling has a collar portion and a pair of collar edges, with bolts attaching the collar edges together and further including a torque stop plate positioned on one of the pair of collar edges such that when the coupling is in the tightened position the other of the pair of edges rests against the torque stop plate.

2. A remote pipe coupling system as claimed in claim 1 further including a closed stop attached to the second pipe such that the coupling rests against the closed stop when the coupling is in the closed position.

3. A remote pipe coupling system as claimed in claim 2 further including an open stop attached to the first pipe such that the coupling may rest against the open stop when the coupling is in the open position.

4. A remote pipe coupling system as claimed in claim 3 wherein the remote moving means is a moving tool having a collar attached to an elongate shaft with a handle portion, the collar having distal ends fits around the first and second pipes and when positioned around one of the first and second pipes the distal ends bear against the coupling.

5. A remote pipe coupling system as claimed in claim 4 wherein the remote changing means includes a wrench portion attached to an elongate shaft and a handle.

6. A remote pipe coupling system as claimed in claim 5 wherein the handle of the remote changing means is a T-bar handle.

7. A remote pipe coupling system as claimed in claim 1 wherein the remote moving means is a moving tool having a collar attached to an elongate shaft with a handle portion, the collar having distal ends fits around the first and second pipes and when positioned around one of the first and second pipes the distal ends bear against the coupling.

* * * * *